(12) United States Patent
Hassin

(10) Patent No.: US 10,169,834 B2
(45) Date of Patent: Jan. 1, 2019

(54) CONSERVATION DEVICE, SYSTEM AND METHOD

(71) Applicant: Bryan Guido Hassin, Chapel Hill, NC (US)

(72) Inventor: Bryan Guido Hassin, Chapel Hill, NC (US)

( * ) Notice: Subject to any disclaimer, the term of this patent is extended or adjusted under 35 U.S.C. 154(b) by 600 days.

(21) Appl. No.: 14/239,545

(22) PCT Filed: Sep. 24, 2012

(86) PCT No.: PCT/US2012/056920
§ 371 (c)(1),
(2) Date: Feb. 19, 2014

(87) PCT Pub. No.: WO2013/048964
PCT Pub. Date: Apr. 4, 2013

(65) Prior Publication Data
US 2014/0188294 A1     Jul. 3, 2014

Related U.S. Application Data

(60) Provisional application No. 61/539,769, filed on Sep. 27, 2011.

(51) Int. Cl.
*G06Q 50/06* (2012.01)
*G01D 4/00* (2006.01)
*H01R 13/66* (2006.01)
*H01R 24/78* (2011.01)

(52) U.S. Cl.
CPC .......... *G06Q 50/06* (2013.01); *G01D 4/002* (2013.01); *H01R 13/6683* (2013.01); *H01R 24/78* (2013.01); *Y02B 70/343* (2013.01); *Y02B 90/241* (2013.01); *Y04S 20/32* (2013.01); *Y04S 20/34* (2013.01)

(58) Field of Classification Search
CPC ............................. Y02B 70/343; Y04S 20/34
USPC .................................................. 700/286, 289
See application file for complete search history.

(56) References Cited

U.S. PATENT DOCUMENTS

| | | | | |
|---|---|---|---|---|
| 7,877,198 | B2* | 1/2011 | Tenzer ................. | G06Q 10/04 123/339.17 |
| 2004/0246512 | A1* | 12/2004 | Miyamoto ................. | B41J 2/04 358/1.13 |
| 2009/0177594 | A1* | 7/2009 | Williams, Jr. .......... | E03B 7/071 705/412 |
| 2010/0070217 | A1* | 3/2010 | Shimada ................ | G01D 4/008 702/62 |
| 2010/0121700 | A1* | 5/2010 | Wigder .................. | G06Q 10/06 705/14.25 |
| 2010/0174419 | A1* | 7/2010 | Brumfield .............. | G01R 22/10 700/295 |

(Continued)

OTHER PUBLICATIONS

Marcus et al., "Going Green at Home: The Green Machine" Information Design Journal 2009, 17(3), pp. 233-243.*

*Primary Examiner* — Emilio J Saavedra

(57) ABSTRACT

A system includes a processor that is connected with a communication network A smart circuit monitor is connected with a power line. The smart circuit monitor is in communication with the processor by way of the network. A first smart socket is connected with a power line. The first smart socket is in communication with the processor by way of the network. The first smart socket is associated with a first user.

13 Claims, 1 Drawing Sheet

(56) References Cited

U.S. PATENT DOCUMENTS

| | | | |
|---|---|---|---|
| 2011/0099063 A1* | 4/2011 | Clemmons | G06Q 30/02 705/14.49 |
| 2012/0117503 A1* | 5/2012 | Hofrichter | G06Q 30/0251 715/772 |

* cited by examiner

CONSERVATION DEVICE, SYSTEM AND METHOD

PRIORITY INFORMATION

This patent application claims priority to U.S. Provisional Patent Application No. 61/539,769 filed on Sep. 27, 2011.

TECHNICAL FIELD

The present application relates to energy conservation devices, methods and systems. More specifically, the present application relates to generation, reception, organization and presentation of user consumption data as well as display of user consumption data to other users.

SUMMARY

The following is a brief summary of an embodiment and is not meant in any way to unduly limit any present or future related claims in this application.

A system includes a processor that is connected with a communication network. A smart circuit monitor is connected with a power line. The smart circuit monitor is in communication with the processor by way of the network. A first smart socket is connected with a power line. The first smart socket is in communication with the processor by way of the network. The first smart socket is associated with a first user. A second smart socket is connected with a power line. The second smart socket is in communication with the processor by way of the network. The second smart socket is associated with a second user. A first display is associated with the first user. The second display is connected with the processor by way of the network. A second display is associated with the second user. The second display is connected with the processor by way of the network.

BRIEF DESCRIPTION OF THE FIGURES

The following brief description of the figures is meant to help aid the understanding of one skilled in the art and is not meant in any way to unduly limit any present or future claims related to this application.

DETAILED DESCRIPTION

Figure 1:
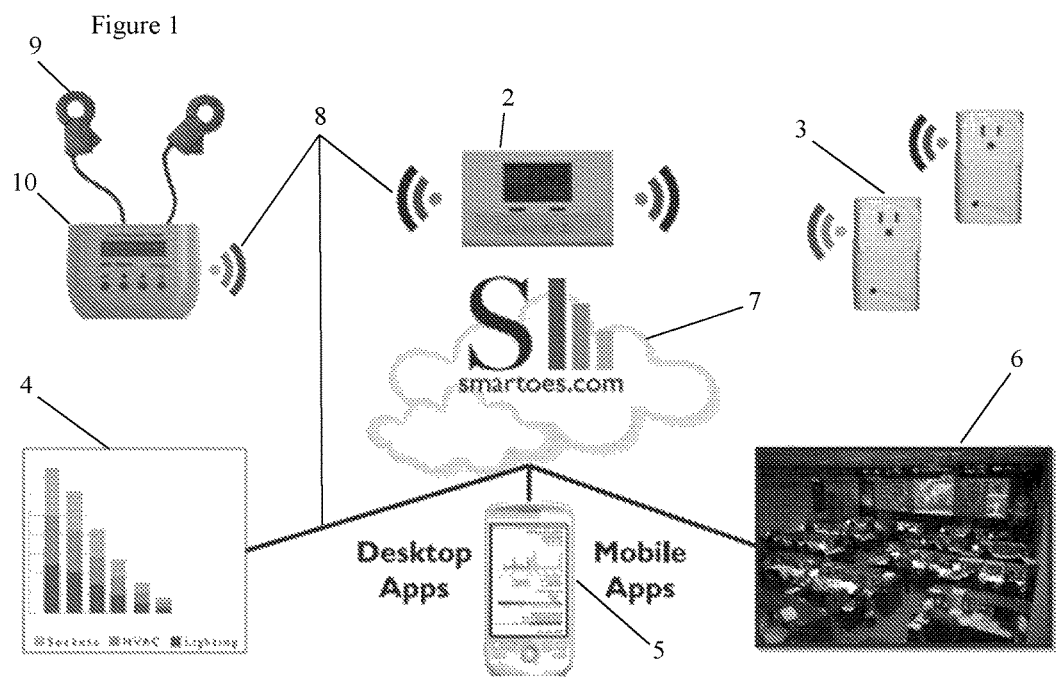
FIG. 1 shows a schematic of various embodiments.
Figure 2:
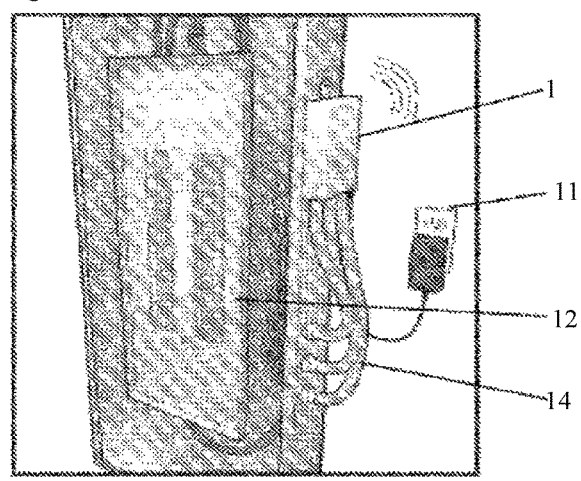
FIG. 2 shows an asymmetric view of a smart circuit monitor according to various embodiments.

The following detailed description discusses a number of combinations of embodied features and is meant to help one skilled in the art understand the present disclosure. The detailed description and the various embodiments described are not meant in any way to unduly limit any present or future related claims.

The present application relates to systems, designs, devices and methods of/for energy conservation within buildings, groups of buildings, or other networks of power consumers (e.g., appliances, computers, servers, and other electrical using devices).

In the modern business infrastructure, a large percentage (in various situations as much as 20%) of overhead costs can be attributed to electricity consumption. Electricity can be used to power computers, lights, heating, cooling, elevators, escalators, televisions, phones, projectors, copiers, coffee makers, automatic doors, air blowers and other similar equipment. In the near future this use could easily be extended to cars and other devices. As with businesses, a large percentage of overall household costs are attributable to electricity consumption.

Other forms of energy are equally used inefficiently, such as oil and gas and other combustible fuels. Further, water can be consumer in an inefficient manner. The embodiments described herein can equally be applied to monitor and help conserve hydrocarbons and water.

There have been many attempts to increase the efficiency of energy using devices. For example, incandescent light bulbs have been replaced with fluorescent bulbs. Computers have power save options. Air conditioning systems and heating systems (HVAC) have been largely automated to allow for the more efficient power consumption. Also, individuals have been encouraged to conserve energy through exercises such as turning off lights when not needed, and to utilize power save options on electrical equipment such as computers. Further, conservation of fossil fuels (hydrocarbons) and water is encouraged as well.

Even with those steps, energy consumption for businesses, offices and homes leaves much to be desired. This shortcoming is largely attributable to failure to address the users or groups of users' behavior. In other words, at least as important as efficient devices are efficient users of the devices. For example, even if a computer uses half as much electricity as earlier models, there is nothing stopping a user from leaving the computer on longer. Even if lights are switched to fluorescent, there is little control over a user leaving the lights on. In fact, if users believe the devices are energy efficient, they are perhaps more likely to overuse such.

With respect to heating and cooling, there is even less control over the user's specific behavior as heating and cooling generally affects large groups of people. There is therefore more of an indirect association between power use of a group in a building and each individual. Thus, cooling and heating are generally tailored to make the most individuals comfortable and therefore is massively inefficient. It is not uncommon in office buildings for the cooling to be turned on so low (to accommodate those people that require a colder environment) that other people feel the need to use space heaters at their work area to keep warm. That is an example of wasting energy.

Where cars become more energy efficient, people can be encouraged to drive more miles without worry of using too much fuel.

This issue is significant enough that some businesses actually encourage reports to be made when employees leave computers on overnight, lights on when not needed, and misuse the heating/cooling systems. That is a clear indication of an unmet need with respect to a simple and effective way to conserve energy by correcting specific user's behavior.

According to various embodied features herein the present application, many aspects of these problems are addressed by comprehensive designs, systems and methods that allow users to be directly evaluated, communicated with, and encouraged to reduce energy consumption at an individual and/or group behavioral level. Various combinations of embodied features address the disjoint between energy conservation initiatives and the actual user's behavior. Various embodiments in the present application disclose a system and design that monitors power usage of each user within a group of users, evaluates such usage, and reports the usage of each user to all the other users in the group. The information is provided in a visible form to the users and shows how one relates to the others. Embodiments of the system will upon occasion herein be referred to as SmartOES™. As noted, these ideas are equally applied to hydrocarbon consumption and/or water consumption. Also, the consumption could be consumption of money.

Various units or assignments of value can be assigned to or taken from a user depending on the level of power usage and other actions achievements taken/made by users or groups of users. One way to assign value is to calculate a score (Energy IQ) for a user.

As shown in FIG. 1, some features of the present design are smart circuit monitors 1 (smart circuit monitors can include an aggregator 10 that aggregates signals from one or more CT clamps 9 and are available commercially from, e.g., SmartOES™), smart sockets 3, user displays 5, and a processor 7 that are all connected by way of a network 8. The CT clamps 9 can connect to an electrical circuit. A processor 7 can be any computing instrument capable of taking consumption data, evaluating the consumption data, and presenting related data to users to in turn effect change in the users' behavior and conserve energy and/or water.

A smart circuit monitor 1, of which an aggregator 10 is a component, connects to an electrical circuit in a building. The smart circuit monitor 1 measures power usage. The power usage information can be saved or can be transmitted to a processor 7 by way of wires or wirelessly in a network 8. The wires could be Ethernet cable, a phone line, a communication line or a power line. The information could also be transmitted wirelessly by wi-fi, ZigBee, or other radio waves.

The smart socket 3 can be a conduit between the power socket of a building 11 and a device. The smart socket 3 plugs into a power supply 3 (e.g., wall outlet) with a male portion. The smart socket 3 has a female portion where the male portion of an electrical device is plugged. The smart socket 3 may have plural female portions. The smart socket 3 can measure the power consumption of devices (in congregate or individually) plugged into the smart socket 3. Where the smart socket 3 has plural female portions, the smart socket 3 can measure the power consumption for each device that is connected. Each female socket of the smart socket 3 can be identified with a particular device automatically or by user input. The smart socket 3 can save the information (with a memory) or can transmit the information to the processor 7 by way of the network 8 with phone lines, Ethernet lines, cable lines, power lines, or other communication lines. The smart socket 3 can also transmit the information to the processor 7 wirelessly with wi-fi, ZigBee, or other radio waves over the network 8.

The user display 4 can be displayed on a device 5 such as a computer monitor, a tablet display, a smart phone display, a phone screen, a television screen, a projector screen, or any other electronic visual medium. The display 5 is connected to the processor 7 by way of the network 8. The network 8 can be the Internet, or an intranet in a building or home. The connection can be my wire or by wireless connection. A number of displays can be located in a central monitoring station 6.

The processor 7 can be a computing system that is connected to the smart sockets 3. The processor 7 can be a computer, a server, or other computing device. The processor 7 can also be a series of computers, servers or computing devices that are connected by way of a network 8.

The network 8 can be a single network or a series of networks 8 that are interconnected to functionally form a single network 8 for the purposes described in the present application.

Looking more specifically at an embodiment, FIG. 1 shows smart circuit monitors 1 connecting near breakers 12 and main power lines 14 in a building. The smart circuit monitors 1 measure the power consumed and can save such information for later transmission or download to the processor 7. The smart circuit monitors 1 can also transmit that information to a central processing unit 7 (SmartOES.com) or into a network of computers or other processor devices in real time. The transmission can be by wire (e.g., an Ethernet connection) or wirelessly by wi-fi, ZigBee, or other wireless transmission modes, along a network 8.

An embodiment according to the present application relates to a design and system having a smart circuit monitor 1 that measures and wirelessly transmits user, group, or device energy usage data. This smart circuit monitor 1 can be installed on or near an industrial circuit breaker panel 12. The energy can be measured using current transformer (CT) probes 9 (also known as CT clamps) that can quickly and easily be installed inside the panel. The smart circuit monitor 1 can measure AC current in amperes and calculate power consumption in kilowatts (kW) or kilowatt hours (kW Hr) that will be calculated by assuming a nominal value for the AC voltage, and the power factor will be assumed to be 1.0. Energy usage data can be gathered and transmitted wirelessly using a ZigBee radio running a smart energy profile (SEP).

The value of a platform service designed to interact with office employees has been demonstrated. Using feedback and encouragement with the users of the energy, it has been proven that the platform can effectively change behavior resulting in energy savings. According to embodiments, some of the component devices include a gateway device between a ZigBee network and the internet, a device to measure energy use of each circuit (smart circuit monitor 1) and radio controlled electrical sockets. Gateway and radio controlled socket devices are available commercially. Smart circuit monitors 1 are also available commercially.

Smart sockets 3 can plug into common sockets 11 and accept the male portion of electrical devices. For example, a smart socket 3 fits into a socket and has two female connections for a plug of an electrical device. Also, the smart socket 3 could be in the form of a power strip or power block, where a single male plug of the smart socket connects into a socket and provides multiple female connectors for electrical devices. This configuration can be useful to monitor the total power consumed by a single user where a number of different devices are used. The various sockets can be assigned to the various devices. This can be done by the user inputting such information to the processor 7 (SmartOES.com). For example, one connector can be assigned to a computer while another connector can be assigned to a lamp. The smart sockets 3 can connect to a central processor or to a network of central processors 7 by way of an Ethernet cable. The signals can also be transmitted over the electrical system. Also, wireless communications can be used to transmit the signal. The signal can communicate the user's identity, the amount of power consumed by each device, the power consumed by the user as a whole, the time over which the power is consumed, the rate at which power is used at various times, and/or the times power is used and the times power is not being used.

Smart sockets 3 can be installed in a commonly available electrical socket 11. They can connect and disconnect power to an appliance. The device could measure AC current and/or AC voltage. Energy in kilowatts (kW) or kilowatt hours (kW Hr) will be calculated using a commercially available integrated circuit (IC), and reported using a ZigBee radio utilizing the Smart Energy Profile. Smart sockets 3 may be able to turn off power to a device based on evaluations made by the processor. A manual over ride switch may be included to allow the end user to manually request that the appliance be powered.

In FIG. 1, the central processer 7 is shown as being a web based processor connected to by way of SmartOES.com. The processor 7 can be a single computer that communicates with the smart sockets 3 and the smart circuit monitor 1 by way of a network 8. The communication can be by any way previously mentioned. Also, the central processor 7 could be a series of computers, e.g., computers connected on a network. Also, the processor 7 could be a server or servers.

The processor 7 can process a number of detected factors including cumulative historical (actual energy levels), energy use decreasing/increasing, use of shared equipment, use of more efficient equipment, up time, down time, patterns of use, deviation from patterns of use, and use with respect to productivity and hours worked. From detecting and recording various factors, the present design tracks energy use of various users (or groups of users), tracks use of various products that are used, and builds a database with this information.

The central processor 7 can analyze the data and provide data for a user or group of users to other users or groups of users. This information can be provided by way of visual display screens 5 and can be provided in real time displays, e-mail messages, SMS messages or other electronic visual display messaging.

The content of the messages can be each user's power usage, power saved, improvement over a period of time, trends, achievement, or lack thereof. Various points or values can be attached to various milestones. For example, the processor 7 may assign a point to a user who decreases power consumption month to month. The processor 7 may deduct a point from a user who uses a certain % more power from month to month. The processor 7 may assign labels to a user depending on the user's power consumption, e.g., gold, silver or bronze. Other representative labels can be used such as numbers or letter grades (A, B, C, D, F). The processor can also group users based on performance into different groups. Users could be in a division and/or on a team in that division. Some teams could perform better than others and have corresponding scores attached. The processor could organize weekly head to head competitions between various teams or particular users. Users could set up head to head matchups though challenges set up though the processor.

This information could also be provided to vendors of appliances and used to provide specific offers for sale of appliances to users based on their energy consumption. For example, based on a specific user's consumption, or a group of users' consumption, offers for appliances and equipment that properly fit the users' energy consumption could be offered. These offers could be sent by way of the SmartOES system or over the network in any known manner. The information that forms the basis for these offers could be sold to the appliance supplier. Another example would be to provide offers to buy appliances where a report could be generated that would show how using different appliances (e.g., copiers, heaters, stoves, lights, or other electrical equipment) could save energy and money overall. This would help save businesses money and also help sales of new equipment for suppliers. For example, a supplier of copiers could monitor consumption associated with copiers in an office and provide a report to show that by upgrading to a newer more energy efficient copier that the client would save a certain amount of money over a period of time. The same could be said for computers in an office, servers, any electrical appliance. This would equally apply to devices that consume any hydrocarbons or useable fuels.

In any event, the user data of each user (or unit) in a group of users (or units) can be collected, analyzed, organized and displayed to each other user or unit in a visual display such as a visual screen 5.

The information about a user can be organized and presented to another user. This can include total usage with respect to the others, cost savings, rank out of the group, trend within the group, a grade level based on usage for the user, or other comparative expressions. One interest is to show how an individual user or group of users is performing with respect to the other users or groups of users. This will foster competition and accountability through provision of clarity.

Another aspect of the present application is the matching of laggards with strong performers by the processor. Also, an administrator could do the matching in place of the processor. The matching could be grouping of a laggard user(s) with strong performing user(s). This can establish a "virtual support network", which has been shown to be very effective in promoting improvement of the laggard(s).

The processor 7 can also send the user's information to management (who may or may not be a user or group). Based on results, overall savings can be quantified based on electricity prices and monetary rewards can be made to individual users or groups. For example, a user may receive a percentage of the total saving attributed to them every month. Also, certain benefits may be given such as parking spots or extra vacation days. Coupons, special offer, discounts, or other commercial offers could be provides as well.

An embodied system can identify devices that use very little energy and those that use a large amount of energy, with respect to the overall energy usage of a user or group. This can also be done for a group of users. A single person could have a device be identified as their "green" device. A device that uses a relatively large amount of energy can be identified as a "red" device. A single person's space could have a "red" device identified. Or, a group of users could have a "red" device identified as a copier machine, an elevator, or a heating system. Also, a floor of a building, a building, or a complex of buildings could have a "red" device identified. The "red" and "green" devices can be segregated by virtue of them either being in or out of X % of energy used in a unit, or be based on total power usage. By identifying "red" devices people can be informed and motivated to reduce unnecessary use of such.

It should be noted that the present application is not limited to measurement of only total energy usage. According to various embodiments consumption of various people/ devices can be correlated with "off hours", weather, time, outside temperature, inside temperature, humidity, hours of daylight. Also, it should be understood that these combinations of embodied features can be applied to consumption of not only electricity, but other consumed items such as gas, natural gas and water.

The system can also assign users to groups and change such groups (which can be referred to as "teams"). Various values can be given to the groups depending on usage. This encourages each team member to do their part to help the group succeed. According to an embodiment each team can vote to remove members who underperform, can invite new members, and/or can trade members. This can be administrated electronically by the processor 7 (e.g., Smart-OES.com) where each user (an individual or a leader or a group of members) has input by way of an interface with the processor. Also, average teammate energy use can be used.

These items can be enabled by the system's ability to measure an individual's power consumption and trends, the buildings power consumption, to organize and analyze the data, and to present visually the data to the other users or groups of users. The feature of showing everyone else's performance is a strong motivational factor for encouraging electricity conservation.

This particular technical system and capabilities is particularly effective and has been validated by extensive behavioral research. That is, the design of the system allows and ensures that natural friendship and social mentality present in humans will encourage the desired behavior thereby increasing efficiency and conservation.

A setup could be for an office to assemble teams of 3-7 persons, but other numbers could be used. Each person would be identified as a user within the team (unit). These numbers help ensure good communication between teammates and keeping it low increases the chances of a "natural leader" being identified to encourage and motivate their teammates to improve their Energy IQ.

According to a designed system, individual units (or individual users) can be tracked and displayed for others to see. For example, user 1 may use 4 Kw per working hour, while user 2 may use 2 Kw per working hour. Also, individual power use for a user may be identified only to other members of the group. Also, an individual user's power usage may be provided only to a team leader. The team leader can be determined by the members of the team.

According to various embodiments of a present design, team spirit can be fostered. Teams can compete against other teams for various titles for energy reducing/efficiency competition.

An issue relates to the development of loners, i.e., persons who are not adequately meeting conservation expectations and are excluded from a team. The design can allow another team to be rewarded for adopting cast off users and can be rewarded for individual improvement of that user. Presumably groups are initially formed on a friendship basis, but once individual energy profiles (I.Q's) are developed teams can either encourage their teammates to do better or vote them off.

In addition to a "point" system of Energy IQ, a system of "badges" can be used to assign recognition for accomplishment, e.g., specific tasks.

According to one embodiment, a team member can only be voted off if they are a certain (somewhat significant) level below the other teammates. The processor can track the differences and suggest that the teammate be voted off. If they are, then they are "put up for adoption" and another team has the incentive to take them on and improve them and earn extra points/badge for doing so. According to an embodiment, team members could only be voted off by a unanimous vote. New team members could only approved with an at least 60% vote of the existing team. Once approved new member status could be automatically updated in the SmartOES™ database so that Admin always knows which teams an individual is currently on.

A kicked-off teammate could also create a new team by recruiting at least 2 others (3 person minimum per team). This would incentivize people to invite high energy using people to join a group and have them improve their usage. "Adopt someone" can produce a reward of predetermined value.

Teams could be created outside a particular office building or company. Users can also create a team with friends outside of the company, through LinkedIn™ or Facebook™ for example. This encourages people to "cross pollinate" and share their experiences of what has worked for them in improving energy use. People can see on their social network who is in the SmartOES™ network and who are not. They can invite new people to join. The invitee can get a discount or reward if they do and the inviter can get the same. Companies can reward individuals who partake in these systems (SmartOES™) on an individual basis before it is adopted company wide. Also, businesses can contract with a provided to provide incentives for every employee who partakes and/or achieves certain levels of performance or improvement (e.g., gift cards or other monetary rewards).

Looking at an individual situation, a newcomer to SmartOES™ would sign up and would get a socket and create a Profile. This by default creates a profile for the company that employs the newcomer. The company will then have an incentive to take control of that profile.

According to embodiments, new users could get extra points for championing SmartOES™ at their company (being the first user to sign up), while the inviter gets extra points for having planted the SmartOES™ seed at that other company. This encourages individuals to continue to improve their Energy IQ even once they have reached their optimal levels of energy use.

According to another embodied feature, an administrator can create teams. This is especially good for large corporations where company culture may not have existing friendships, which would increase energy saving practices. If individual-created groups are not developed, then SmartOES™ can allow for and ensure that communications about team standings and achievements are properly publicized and communicated to keep individuals aware of their energy usage and encourage them to be efficient. This is less of an issue with friendship-based teams who will already be communicating socially and will likely discuss the SmartOES™ and their team's standing. Corporate groups can be a starting point for individuals to get their taste for SmartOES™, but then they are encouraged to create their own groups as well.

The preceding description provides details of a number of embodiments and is meant to aid the understanding of one skilled in the art. The description is not meant in any way to unduly limit any present or subsequent related claims.

The invention claimed is:
1. An energy monitoring and conservation system for a building, comprising:
 a support network for encouraging energy saving habits, comprising;
 a processor that is connected with a communication network;
 a plurality of smart circuit monitors that are connected with power lines wherein each measures power usage through the respective power line, and each is communicatively connected to the processor by way of the communication network;
 a plurality of first smart sockets connected with the power lines in the building via wall outlets that are permanently connected with the building, the plurality of first smart sockets in communication with the processor by way of the communication network, the plurality of first smart sockets associated with a first user group;
 a plurality of second smart sockets connected with the power lines in the building via wall outlets that are permanently connected with the building, the plurality of second smart sockets in communication with the processor by way of the communication network, the plurality of second smart sockets associated with a second user group;

a first display associated with the first user group, the first display being connected with the processor by way of the network; and a second display associated with the second user group, the second display being connected with the processor by way of the network; wherein each smart socket has a male portion that plugs into the respective wall outlet, and has plural female portions that accept male portions of power consumption devices, and the smart socket measures power consumption of the power consumption devices in congregate or individually; wherein the plurality of first smart sockets transmits information relating to power consumption of the power consumption devices plugged into the plurality of first smart sockets to the processor by way of the network;

wherein the first display is a computer monitor that is connected with a computer, the computer connecting with the processor by way of the network;

wherein the second display is a computer monitor that is connected with a computer, the computer connecting with the processor by way of the network;

wherein the first user group comprises at least two users forming a first team of users, wherein a first user who is selected because they are identified as using a first amount of energy and a second user who is selected because they are identified as using a second amount of energy that is lower than the first amount of energy, and the second group comprises at least two users forming a second team of users, wherein a third user who is selected because they are identified as using a third amount of energy and a fourth user who is selected because they are identified as using a fourth amount of energy that is lower than the third amount of energy;

the first display showing data relating to consumption of the first user compared to consumption of the second user within the first user group, and the first user group's consumption with respect to the second user group's consumption, to effect change in the first user group's behavior and reduce the first user group's consumption by fostering competition and accountability;

the second display showing data relating to consumption of the third user compared to consumption of the fourth user within the second user group, and the second user group's consumption with respect to the first user group's consumption to effect change in the second user group's behavior and reduce the second user group's consumption by fostering competition and accountability; and a reward scheme coupled with a deterrent scheme within the support network, wherein the reward scheme provides a reward to individual users and teams using reduced amounts of energy, and the deterrent scheme removes a reward and allows removal of users from teams when if they are not using reduced amounts of energy.

2. The system of claim 1, wherein the plurality of first sockets transmits the information by way of at least one selected from a list comprising: an Ethernet cable, a phone line, a wireless signal, a wi-fi signal, and the power line.

3. The system of claim 1, comprising a smart circuit monitor connected with a power line, the smart circuit monitor being in communication with the processor by way of the network.

4. The system of claim 1, wherein the processor is a computer connected to the network.

5. The system of claim 1, wherein the processor is web based.

6. The system of claim 1, wherein the processor comprises a server.

7. A method of power consumption conservation in a building, comprising:

establishing a support network for encouraging energy saving habits, comprising;

connecting a plurality of first smart sockets to power lines in the building via wall outlets that are permanently connect with the building and registering the plurality of smart sockets to a first user group with a processor, the plurality of first smart sockets being connected with the processor by way of a network;

connecting a plurality of second smart sockets to the power lines in the building via wall outlets that are permanently connect with the building and registering the plurality of second smart sockets to a second user group with the processor, the plurality of second smart sockets being connected with the processor by way of the network;

connecting a plurality of smart circuit monitors to the power lines and with each smart circuit monitor measuring power usage through the respective power line, and transmitting that information to the processor by way of the network;

detecting power consumption of power consumption devices connected to the plurality of first smart sockets and transmitting that information to the processor by way of the network;

processing the information with the processor;

wherein each smart socket has a male portion that plugs into the wall outlet, and has plural female portions that accept male portions of the power consumption devices, and the smart socket measures power consumption of the power consumption devices in congregate or individually; wherein the plurality of first smart sockets transmits information relating to the power consumption of the power consumption devices plugged into the plurality of first smart sockets to the processor by way of the network;

wherein the first display is a computer monitor that is connected with a computer, the computer connecting with the processor by way of the network;

wherein the second display is a computer monitor that is connected with a computer, the computer connecting with the processor by way of the network;

selecting a first user group that comprises at least two users forming a first team of users, wherein a first user who is selected because they are identified as using a first amount of energy and a second user who is selected because they are identified as using a second amount of energy that is lower than the first amount, and selecting a second group that comprises at least two users forming a second team of users, wherein a third user who is selected because they are identified as using a third amount of energy and a fourth user who is selected because they are identified as using a fourth amount of energy that is lower than the third amount of energy;

the first display showing data relating to consumption of the first user compared to consumption of the second user within the first user group, and the first user group's consumption with respect to the second user group's consumption to effect change in the first user group's behavior and reduce the first user group's consumption by fostering competition and accountability;

the second display showing data relating to consumption of the third user compared to consumption of the fourth user within the second user group, and the second user group's consumption with respect to the first user group's consumption to effect change in the second user group's behavior and reduce the second user group's consumption by fostering competition and accountability;

and within the support network, establishing a reward scheme coupled with a deterrent scheme, wherein the reward scheme provides a reward to individual users and teams using reduced amounts of energy, and the deterrent scheme removes a reward and allows removal of users from teams when they are not using reduced amounts of energy.

8. The method of claim 7, wherein a classification is assigned to the first user group by the processor depending on the usage detected by the first smart socket.

9. The method of claim 7, wherein the first user group and the second user group are ranked with respect to one another.

10. The method of claim 7, wherein the first user group is grouped based on individual user consumption, so that users with different consumption profiles are grouped together to encourage behavior of modification.

11. A method of energy conservation in a building, comprising:

establishing a support network for encouraging energy saving habits, comprising;

measuring usage of a first user group with a plurality of smart sockets that are connected with power lines in the building via wall outlets that are permanently connect with the building;

measuring usage of a second user group with a plurality of smart sockets that are connected with the power lines in the building via wall outlets that are permanently connect with the building;

measuring usage of the first user group and the second user group with a plurality of smart circuit monitors that are connected with the power lines and each measures power usage through the respective power line, and each are communicatively connected to the communication network and therefore the processor;

transmitting usage data of the first user group to a processor via a network and transmitting usage data of the second user group to the processor via a network;

processing the usage data and returning information relating to the first user group's energy usage and the second user group's energy usage to a visual display associated with the first user group and a visual display associated with the second user group; wherein each smart socket has a male portion that plugs into the wall outlet, and has plural female portions that accept male portions of power consumption devices, and the smart socket measures power consumption of the power consumption;

wherein the second display is a computer monitor that is connected with a computer, the computer connecting with the processor by way of the network;

wherein the first user group comprises at least two users forming a first team of users, wherein a first user who is selected because they are identified as using a first amount of energy and a second user who is selected because they are identified as using a second amount of energy that is lower than the first amount of energy, and the second group comprises at least two users forming a second team of users, wherein a third user who is selected because they are identified as using a third amount of energy and a fourth user who is selected because they are identified as using a fourth amount of energy that is lower than the third amount of energy;

the first display showing data relating to consumption of the first user compared to consumption of the second user within the first user group, and the first user group's consumption with respect to the second user group's consumption to effect change in the first user group's behavior and reduce the first user group's consumption by fostering competition and accountability;

and the second display showing data relating to consumption of the third user compared to consumption of the fourth user within the second user group, and the second user group's consumption with respect to the first user group's consumption to effect change in the second user group's behavior and reduce the second user group's consumption by fostering competition and accountability;

and within the support network, establishing a reward scheme coupled with a deterrent scheme, wherein the reward scheme provides a reward to individual users and teams using reduced amounts of energy, and the deterrent scheme removes a reward and allows for the removal of users from teams when they are not using reduced amounts of energy.

12. The method of claim 11, wherein the usage is of hydrocarbons.

13. The method of claim 11, wherein the usage is of electricity.

* * * * *